United States Patent
Cohn

(10) Patent No.: US 11,966,148 B2
(45) Date of Patent: Apr. 23, 2024

(54) TELESCOPING POLE

(71) Applicant: Jared Cohn, Sherman Oaks, CA (US)

(72) Inventor: Jared Cohn, Sherman Oaks, CA (US)

( * ) Notice: Subject to any disclaimer, the term of this patent is extended or adjusted under 35 U.S.C. 154(b) by 0 days.

(21) Appl. No.: 17/877,995

(22) Filed: Jul. 31, 2022

(65) Prior Publication Data
US 2024/0036443 A1    Feb. 1, 2024

(51) Int. Cl.
*G03B 17/56* (2021.01)

(52) U.S. Cl.
CPC .................................. *G03B 17/561* (2013.01)

(58) Field of Classification Search
CPC .................................................... G03B 17/561
See application file for complete search history.

(56) References Cited

U.S. PATENT DOCUMENTS

| | | | |
|---|---|---|---|
| 9,434,450 B1 * | 9/2016 | Swor | F16F 7/1034 |
| 2012/0181490 A1 * | 7/2012 | Guyard | B66F 3/00 254/97 |

FOREIGN PATENT DOCUMENTS

| | | | |
|---|---|---|---|
| KR | 20160116091 A | * | 6/2019 |
| KR | 20190065975 A | * | 10/2019 |

* cited by examiner

*Primary Examiner* — Minh Q Phan
(74) *Attorney, Agent, or Firm* — Alexander Postnikov

(57) ABSTRACT

A telescoping pole comprised of a plurality of tubular sections, one or more electric motors, and a control module. Linear gear arrangements on the tubular sections are engaged with pinions fixed to the next wider tubular sections. Electric motors rotationally drive the pinions, linearly driving the tubular sections, and, thus, causing the telescoping pole to extend or retract. The length of the telescoping pole can be adjusted during audio/video capture. The telescoping pole is operable hand-held, and adjustments can be made using one hand. The telescoping pole may further comprise clamps, an accessory mount, a base mount, and a counterweight.

10 Claims, 5 Drawing Sheets

TELESCOPING POLE

BACKGROUND

Field of the Invention

The present invention relates generally to the field of audio/video capture devices, and, in particular, to telescoping poles operable to extend or retract during audio/video capture.

Scope of the Prior Art

Telescoping poles are traditionally used for audio/video capture in the film industry. Operators must manually extend or retract sections of a pole to change its length. This process presents several drawbacks. First, performing adjustments is tedious. Adjustment steps include: placing latches in an open position; extending or retracting sections to a desired length; and returning latches to a closed position. Second, performing adjustments during ordinary operation of the telescoping pole interferes with audio/video capture. As a result, existing telescoping poles are only adjusted in between takes.

What is needed is a telescoping pole that can be adjusted during ordinary operation without interfering with audio/video capture. Preferably, the extendable pole is handheld and adjustments can be made with one hand during takes.

SUMMARY

The present disclosure satisfies the foregoing needs by providing, inter alia, a telescoping pole for addressing each of the foregoing desirable traits as well as methods of its use.

One aspect of the present disclosure is directed at a telescoping pole comprising a plurality of tubular sections of decreasing width, one or more electric motors, and a control module. The tubular sections include a cavity configured to movably hold the next narrower tubular sections.

Alternatively, the narrowest tubular section does include a cavity. The tubular sections include linear gear arrangements on their outer surfaces where the linear gear arrangements are engaged by pinons fixed to next wider tubular sections. Alternatively, the widest tubular section does not include a linear gear arrangement. The electric motors are configured to rotationally drive the pinions. The control module is configured to receive user inputs and to control a length of the telescoping pole.

According to an embodiment, the control module is coupled to the widest tubular section.

According to another embodiment, a user can input user commands into the control module during hand-held operation of the telescoping pole.

According to yet another embodiment, the telescoping pole further comprises an accessory mount coupled to the narrowest tubular section, the accessory mount configured to receive an audio and/or video capture devices.

According to yet another embodiment, the telescoping pole further comprises a base mount coupled to the widest tubular section, the base mount configured to receive a base.

According to yet another embodiment, the electric motors are coupled to the tubular sections using clamps.

According to yet another embodiment, the electric motors are integrated into the tubular sections.

According to yet another embodiment, the telescoping pole further comprises a counterweight coupled to the widest tubular section.

BRIEF DESCRIPTION OF THE DRAWINGS

The foregoing summary, as well as the following detailed description of preferred variations of the invention, will be better understood when read in conjunction with the appended drawings. For the purpose of illustrating the invention, there is shown in the drawings variations that are presently preferred. It should be understood, however, that the invention is not limited to the precise arrangements shown. In the drawings, where.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to any single implementation or implementations. Wherever convenient, the same reference numbers will be used throughout the drawings to refer to same or like parts.

Moreover, while variations described herein are primarily discussed in the context of telescoping poles for audio/video capture, it will be recognized by those of ordinary skill that the present disclosure is not so limited. In fact, the principles of the present disclosure described herein may be readily applied to the manipulation of any tool through its attachment to the end of a telescoping pole.

In the present specification, an implementation showing a singular component should not be considered limiting; rather, the disclosure is intended to encompass other implementations including a plurality of the same component, and vice-versa, unless explicitly stated otherwise herein. Further, the present disclosure encompasses present and future known equivalents to the components referred to herein by way of illustration.

It will be recognized that while certain aspects of the technology are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

It will be recognized that the term "coupling," as used throughout this disclosure, means the connection of two components. Coupling can be achieved through common physical or chemical means, including, but not limited to, the use of clamps, screws, adhesives, and the like. Alternatively, coupling can be achieved through integration of one component into the structure and/or framework of another component.

Figure 1:
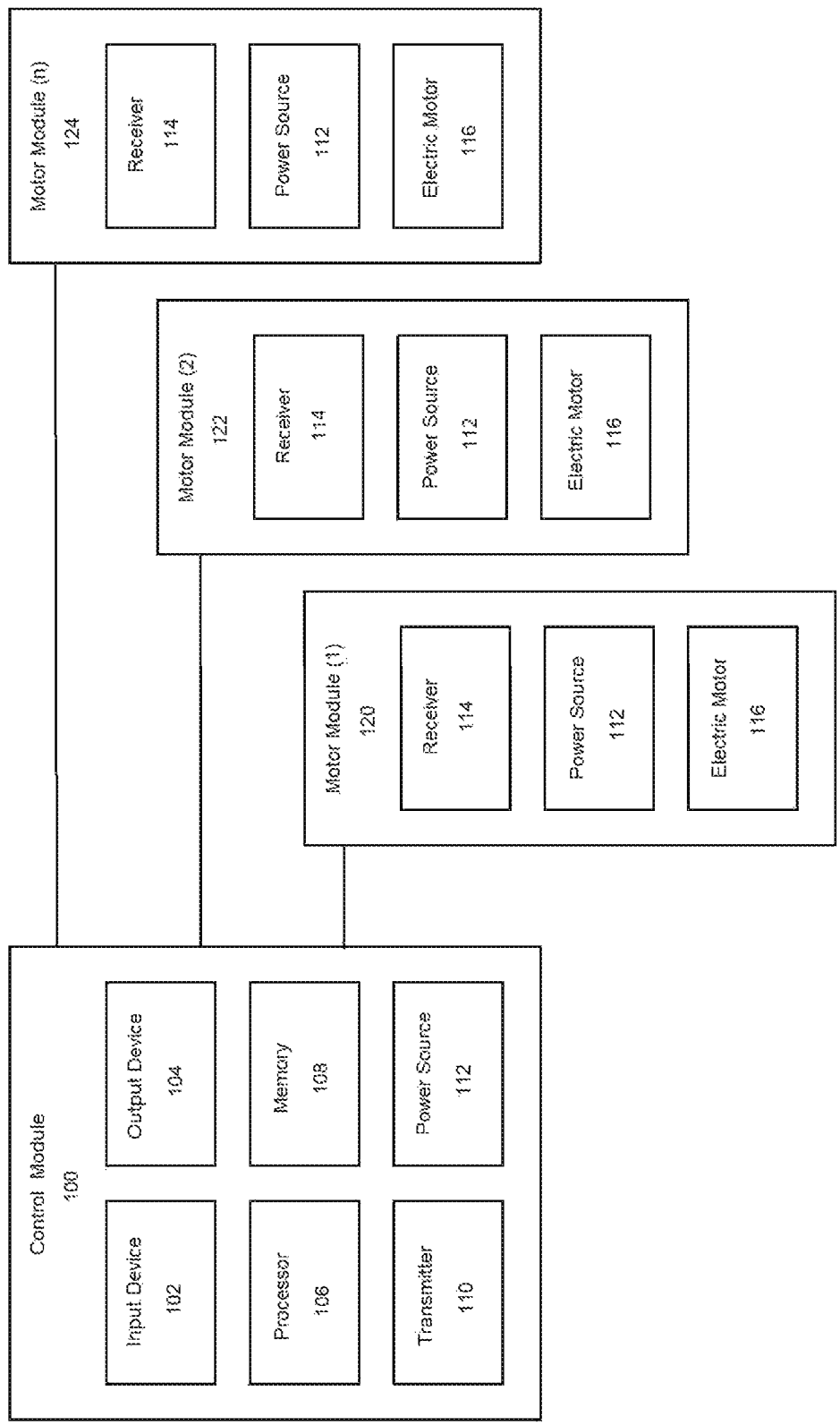
FIG. 1 is a block diagram showing example electrical components of a telescoping pole, according to an embodiment.

FIG. 1 is a block diagram showing example electrical components of a telescoping pole, according to an embodiment. Electrical components of a telescoping pole may comprise a control module 100 and motor modules 120 122 124.

The control module 100 is configured to receive user commands and to control a length of the telescoping pole, as will be later discussed. The control module 100 may comprise an input device 102, an output device 104, a processor 106, memory 108, a transmitter 110, and a power source 112.

The input device 102 is used by a user to interact with the control module 100. According to an embodiment, the input device 102 may be buttons, a dial, a keypad, or a touchscreen. Alternatively, the input device 101 may be a microphone for speech capture, a keyboard, or any other device or method of receiving user commands.

The output device 104 is used by the control module 100 to interact with the user. According to an embodiment, the output device 104 may be a display screen in any of the various forms associated with smart devices. Alternatively, the output device 103 may be a speaker or any other device or method of transmitting updates or data.

The processor 106 executes commands to perform the functions specified throughout this disclosure. It should be appreciated that processing may be implemented either locally via the processor 106 or remotely via various forms of wireless or wired networking technologies or a combination of both.

Memory 108 may include various types of short and long-term memory as is known in the art. Memory 108 may be loaded with computer readable program instructions on how to interpret and execute user commands. These computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Accordingly, memory 108 includes all necessary computer readable program instructions per each embodiment.

The transmitter 110 is configured to broadcast transmissions containing communicative signals and/or data to the motor modules 120 122 124. According to an embodiment, the transmitter 110 may be any transmitter operating according to conventional wired communication media, including, but not limited to, ethernet or fiberoptic cables. Alternatively, the transmitter 110 may be any transmitter operating according to conventional wireless communication media including, but not limited to, a Bluetooth transmitter. It should be appreciated that wireless communication media enables the control module 100 to communicate with motor modules 120 122 124 without a physical connection between the control module 100 and its environment. For example, the control module 100 may employ power line modem technology for communication with motor modules 120 122 124 by transmitting communicative signals through nearby wiring. Yet alternatively, the transmitter 110 may enable communication using transmissions in any frequency of the electromagnetic spectrum including radio, ultrasonic, infrared, and microwave frequencies, or other energy transmission mechanisms, including ultrasonic, auditory, and laser transmissions. That is, the transmitter 100 should be understood to encompass any device or method for communicating, wired or wirelessly, communicative signals and/or data to the electric motor modules 120 122 124. Accordingly, the control module 100 may be programmed to control transmissions in an ordinary manner.

Each power source 112 provides power to the components of the telescoping pole. According to an embodiment, each power source may be a lithium-ion battery or any other conventional power storage device. The control module 100 and the electric motor modules 120 122 124 may receive power from unique, personal power sources 112. Alternatively, the control module 100 and the electric motor modules 120 122 124 may each receive power from a common, shared power source.

The electric motor modules 120 122 124 are configured to rotationally drive pinions, as will be later discussed. Each of the electric motor modules 120 122 124 may comprise a receiver 114, power source 112, and an electric motor 116.

Receivers 114 are configured to receive communicative signals and/or data from the control module 100. According to an embodiment, the receivers 114 may be any receiver operating according to conventional wired communication media including, but not limited to, ethernet or fiberoptic cables. Alternatively, the receivers 114 may be any receiver operating according to conventional wireless communication media including, but not limited to, a Bluetooth receiver. It should be appreciated that wireless communication media enables the control module 100 communicate with the motor modules 120 122 124 without a physical connection between the control module 100 and the motor modules 120 122 124. For example, the receivers 114 may employ power line modem technology for communication with the control module 100 by receiving communicative signals through nearby wiring. Yet alternatively, the receivers 114 may enable communication by receiving transmissions in any frequency of the electromagnetic spectrum including radio, ultrasonic, infrared, and microwave frequencies, or other energy transmission mechanisms, including ultrasonic, auditory, and laser transmissions. That is, the receivers 114 should be understood to encompass any device or method for receiving, wired or wirelessly, communicative signals and/or data from the control module 100. Accordingly, the receivers 114 may be programmed to control the receival of transmissions in an ordinary manner.

The electric motors 116 are configured to rotationally drive the pinions clockwise or counterclockwise. According to an embodiment, the electric motors 116 are coupled to the pinions via a gearbox (not shown). Alternatively, the electric motors 116 directly drive the pinions.

Figure 2:
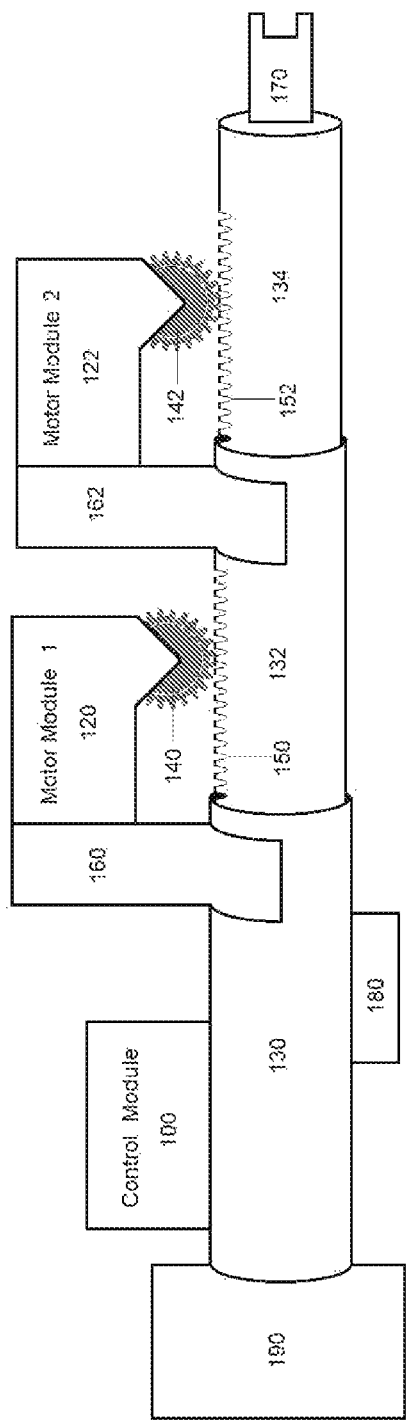
FIG. 2 shows example physical components of a telescoping pole, in a retracted configuration, according to an embodiment.

FIG. 2 shows example physical components of a telescoping pole, in a retracted configuration, according to an embodiment. The physical components are not drawn to scale and not every component is visible. Physical components of the telescoping pole may comprise a control module 100, motor modules 120 122, and tubular sections 130, 132, 134.

The tubular sections 130 132 134 decrease in width from section to section and are configured to slide into each other (e.g., to telescope). According to an embodiment, the tubular sections 130 132 134 include a cavity configured to movably hold a next narrower tubular section. For example, tubular section 130 contains a cylindrical cavity (not shown) that movably holds tubular section 132 and tubular section 132 contains a cylindrical cavity (not shown) that movably holds tubular section 134. In certain embodiments, tubular section 134, being the narrowest tubular section, does not include a cavity.

The term tubular, as used throughout this disclosure, should be interpreted to include any extruded hollow shape, including, but not limited to, rectangular and square tubing.

According to an embodiment, the tubular sections 130 132 134 include linear gear arrangements 150 152 on their outer surfaces. The linear gear arrangements 150 152 are engaged with pinions 140 142 where the pinions 140 142 are fixed to the next wider tubular sections. For example, the linear gear arrangement 150 of tubular section 132 is engaged with a pinion 140 where the pinion 140 is fixed to tubular section 130 and the linear gear arrangement 152 of tubular section 134 is engaged with a pinion 142 where the pinion 142 is fixed to tubular section 132. In certain embodiments, tubular section 130, being the widest tubular section, does not include a linear gear arrangement.

When pinions 140 142 rotate clockwise (when viewed from the angle of FIG. 2), tubular sections 132 134 are pulled inwards, causing the telescoping pole to retract. When pinions 140 142 rotate counterclockwise (when viewed from the angle of FIG. 2), tubular sections 132 134 are pulled outwards, causing the telescoping pole to extend.

According to an embodiment, the widest tubular section acts as a base section (e.g., non-moving relative to the other tubular sections). A user may hold onto this base section during hand-held operation of the telescoping pole.

The control module 100 may be coupled to this base section, permitting a user to input user commands during hand-held operation of the telescoping pole. Alternatively, the control module 100 may be coupled to any of the tubular sections.

Physical components of the telescoping pole may, optionally, further comprise clamps 130 132, an accessory mount 170, a base mount 180, and a counterweight 190.

Clamps 130 132 are used to couple the motor modules 120 122 to the tubular sections 130 132. According to an embodiment, the clamps 160 162 may be any device designed to bind or to press two components together to hold them firmly, for example, but not limited to, a screw clamp.

The accessory mount 170 is coupled to the end of the narrowest tubular section and configured to receive accessories. According to an embodiment, the accessory mount 170 may be a standard mount for the connection of audio/video capture equipment.

The base mount 180 is coupled to the widest tubular section and configured to receive a base. According to an embodiment, the base mount 180 may be a standard mount for the connection of a tripod stand.

The counterweight 190 is coupled to the widest tubular section and used to counteract the torque of the other tubular sections during extension of the telescoping pole. The counterweight 190 may be a simple weight. Alternatively, the counterweight 190 may be an adjustable weight.

Figure 3:
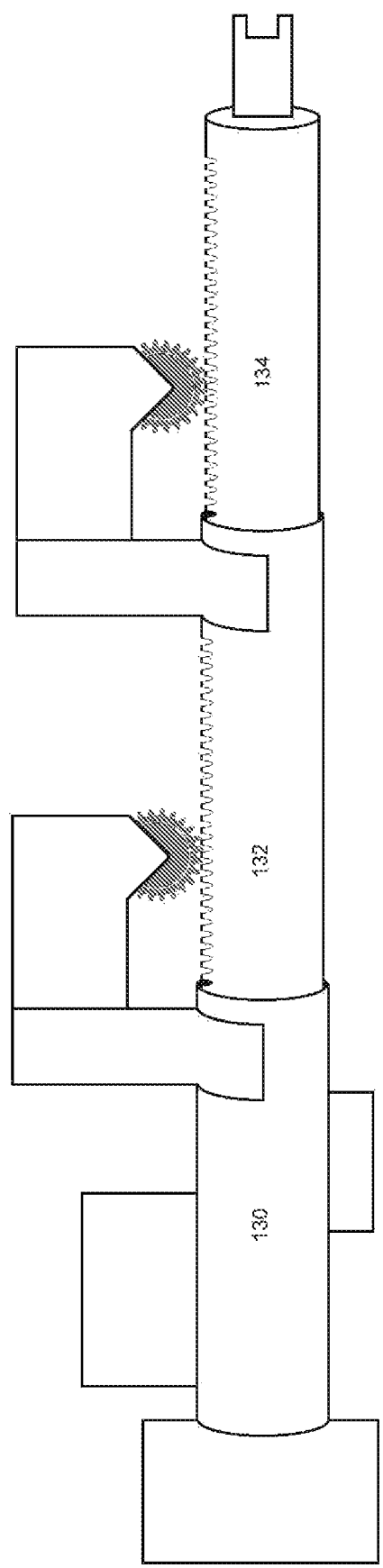
FIG. 3 shows the telescoping pole of FIG. 2 in an extended configuration.

FIG. 3 shows the telescoping pole of FIG. 2 in an extended configuration. Tubular sections 132 134 have been pulled outwards relative to tubular section 130, causing the telescoping pole to extend.

Figure 4:
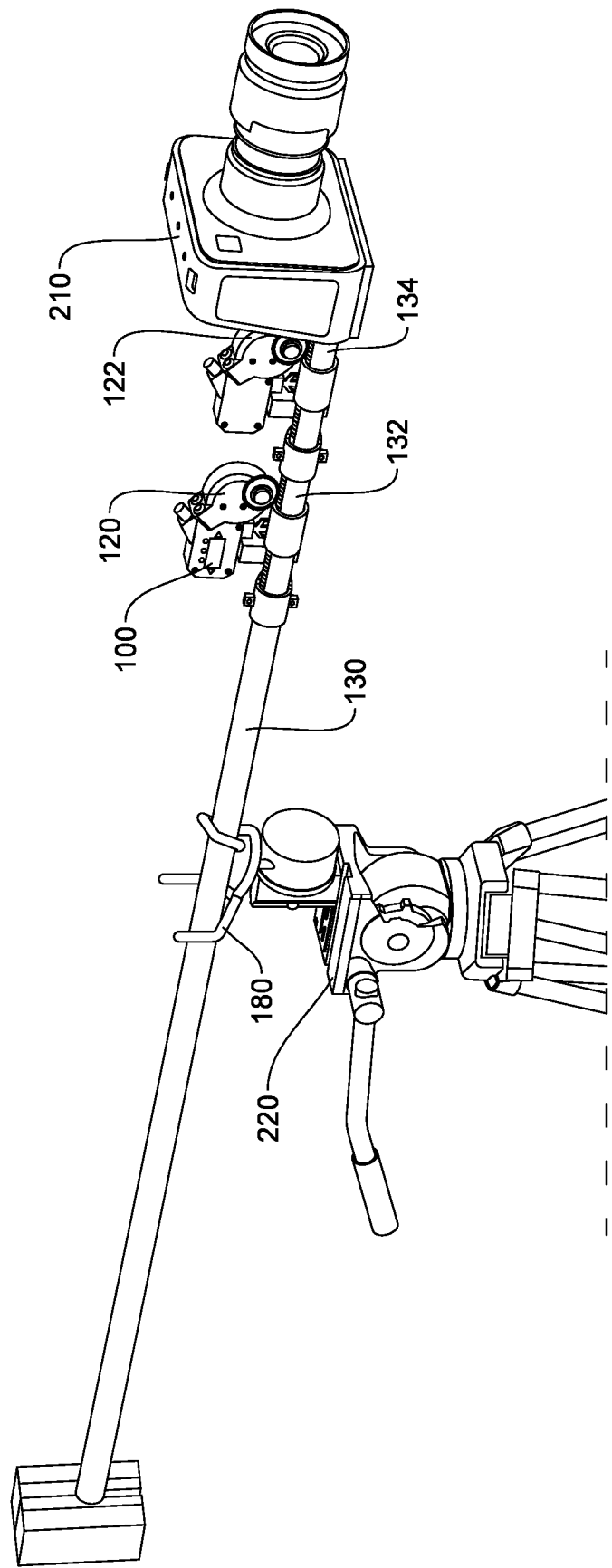
FIG. 4 shows example physical components of a telescoping pole, in a retracted configuration, according to another embodiment.

FIG. 4 shows example physical components of a telescoping pole, in a retracted configuration, according to another embodiment. This embodiment is similar to the embodiment of FIG. 2. However, here, the control module 100 is integrated with the first motor module 120. Also, a camera 210 is attached to the accessory mount (not shown) and a tripod 220 is attached to the base mount 180.

Figure 5:
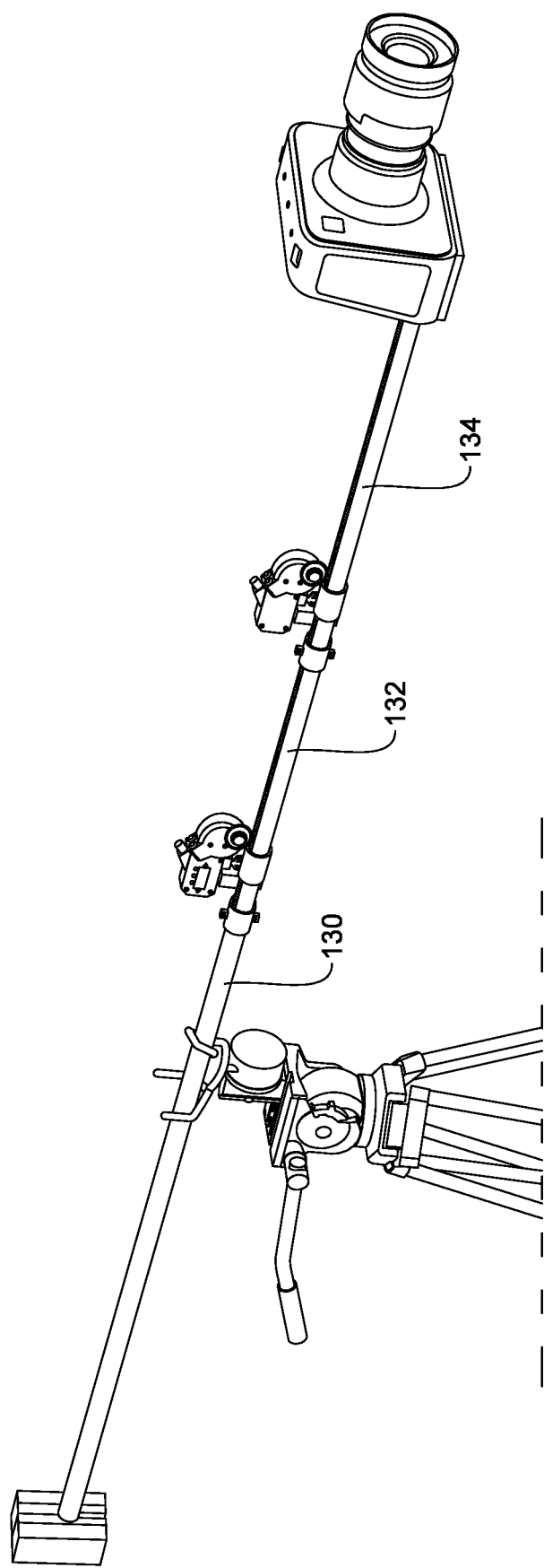
FIG. 5 shows the telescoping pole of FIG. 4 in an extended configuration.

FIG. 5 shows the telescoping pole of FIG. 4 in an extended configuration, according to another embodiment. Tubular sections 132 134 have been pulled outwards relative to tubular section 130, causing the telescoping pole to extend.

The telescoping poles described within this disclosure embody a significant advance over existing telescoping poles that lack the convenience and usability of the instant invention. Users can effortlessly adjust a length of the instant invention by pressing a button on the control module. Furthermore, the instant invention can be adjusted during the audio/video capture processes.

I claim:

1. A telescoping pole comprising:
    at least three tubular sections of decreasing width
        wherein each of the tubular sections, less the narrowest tubular section, includes a cavity configured to movably hold the next narrower tubular section;
        wherein each of the tubular sections, less the widest tubular section, includes a linear gear arrangement on an outer surface, each of the linear gear arrangements configured to engage a pinion fixed to the next wider tubular section;
    at least two electric motors configured to rotationally drive the pinions
        wherein each of the tubular sections, less the narrowest tubular section, is coupled to one of the electric motors;
    a control module configured to receive user commands and to control a length of the telescoping pole wherein the control module is coupled to one of the tubular sections.

2. The telescoping pole of claim 1, wherein
    the control module is coupled to a central tubular section in between the narrowest tubular section and the widest tubular section; and
    a user can hold onto the central tubular section such that the control module is continuously accessible during hand-held operation of the telescoping pole.

3. The telescoping pole of claim 1, wherein
    the telescoping pole is operable hand-held.

4. The telescoping pole of claim 3, wherein
    a user inputs the user commands into the control module during hand-held operation.

5. The telescoping pole of claim 1, further comprising
    an accessory mount coupled to the narrowest tubular section; and
    a counterweight coupled to the widest tubular section.

6. The telescoping pole of claim 1, wherein
    the accessory mount is configured to receive at least one of a video capture device and an audio capture device.

7. The telescoping pole of claim 1, further comprising
    a base mount coupled to the widest tubular section and configured to receive a base.

8. The telescoping pole of claim 1, wherein
    the two or more electric motors are coupled to the tubular sections using a clamp connection.

9. The telescoping pole of claim 1, wherein the two or more electric motors are integrated into the tubular sections.

10. The telescoping pole of claim 1, further comprising a counterweight coupled to the widest tubular section.

* * * * *